United States Patent [19]

Ziolko

[11] Patent Number: 4,463,477
[45] Date of Patent: Aug. 7, 1984

[54] APPARATUS FOR SEPARATING STUFFED SAUSAGE LINKS

[75] Inventor: Francis J. Ziolko, Bridgewater, N.J.

[73] Assignee: Devro, Inc., Somerville, N.J.

[21] Appl. No.: 440,645

[22] Filed: Nov. 10, 1982

Related U.S. Application Data

[63] Continuation-in-part of Ser. No. 279,895, Jul. 2, 1981, Pat. No. 4,418,447.

[51] Int. Cl.³ .............................................. A22C 11/00
[52] U.S. Cl. .......................................... 17/34; 17/1 F
[58] Field of Search .................. 17/34, 33, 49, 1 F

[56] References Cited

U.S. PATENT DOCUMENTS

| 2,730,754 | 1/1956 | Schneider | 17/1 F |
| 3,220,052 | 11/1965 | Heydn | 17/34 |
| 3,306,184 | 2/1967 | Hanau | 17/34 X |
| 3,435,482 | 4/1969 | Ziolko | 17/34 |
| 4,233,709 | 11/1980 | Smith et al. | 17/34 X |

Primary Examiner—Willie G. Abercrombie
Attorney, Agent, or Firm—Michael Q. Tatlow

[57] ABSTRACT

An apparatus for separating sausage links is disclosed. The apparatus has a series of pairs of cutting arms mounted on a circular plate. The arms are moved into contact with the sausage links. As a pair of cutting arms contact the sausage links from opposite sides, they force the links away from the point of contact. There is a cutting element at the end of each arm which cuts the casing between the links when the arms overlap.

5 Claims, 6 Drawing Figures

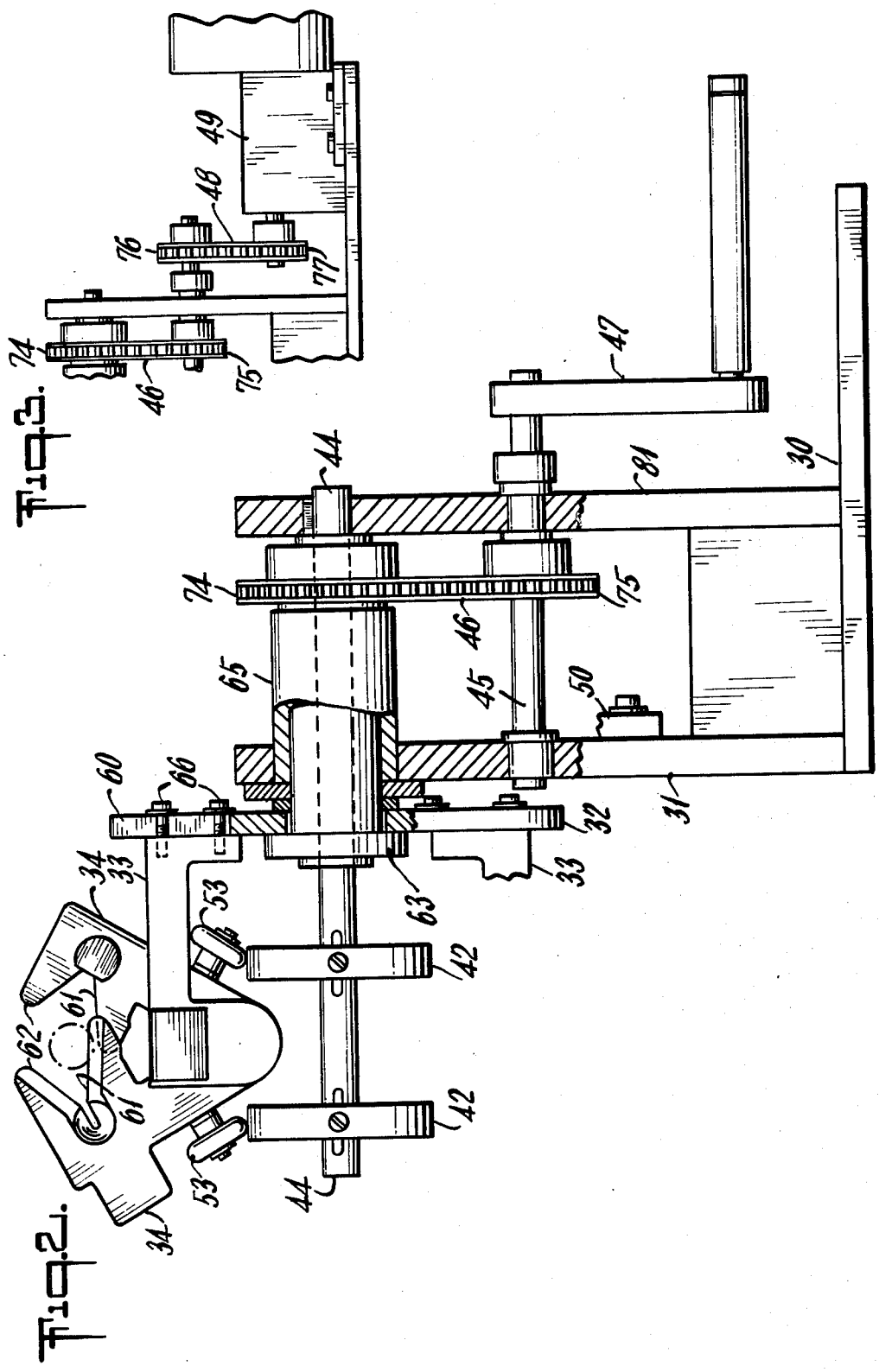

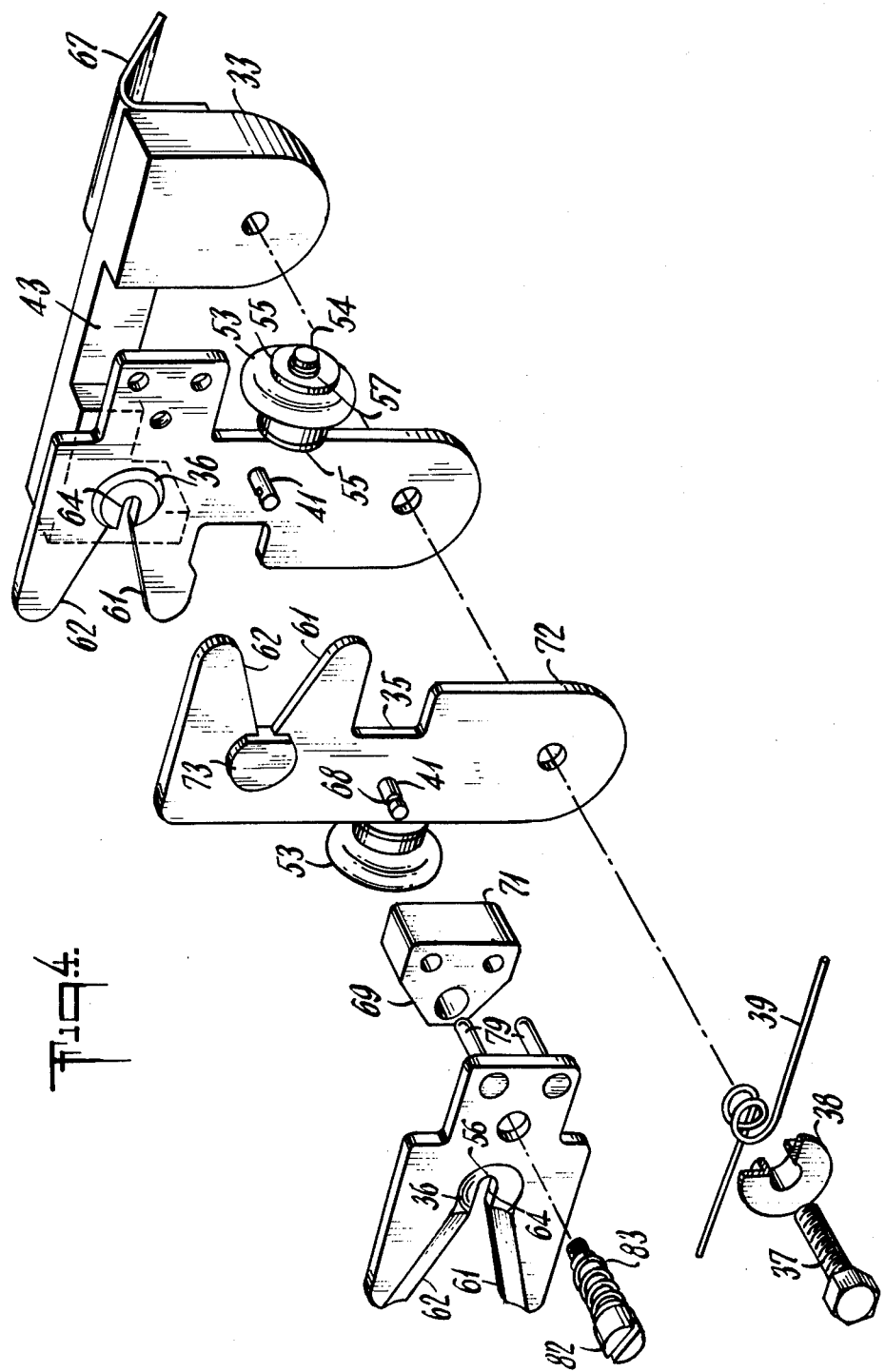

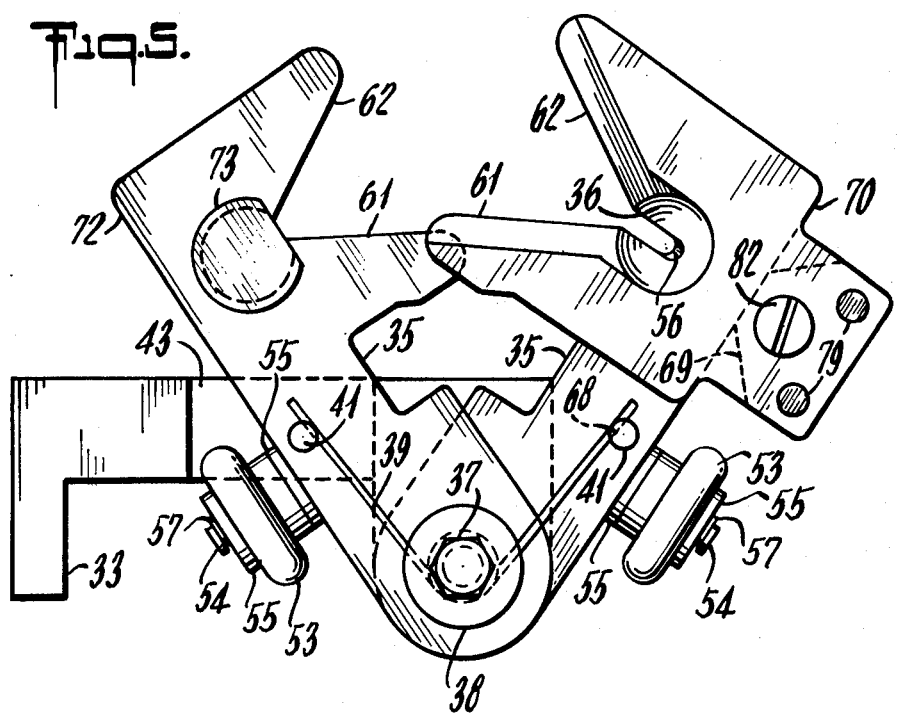
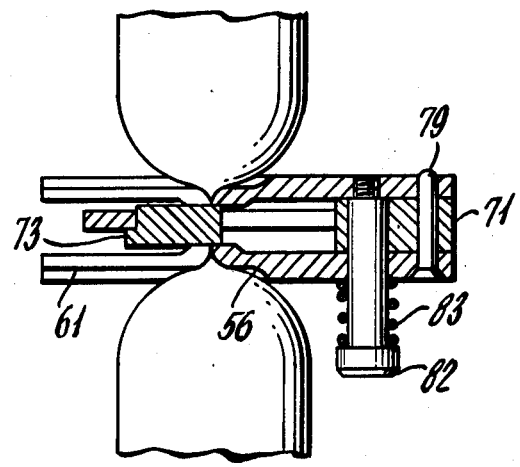

APPARATUS FOR SEPARATING STUFFED SAUSAGE LINKS

This application is a continuation-in-part of application Ser. No. 279,895, filed July 2, 1981, now U.S. Pat. No. 4,418,447.

BACKGROUND OF THE INVENTION

1. The Field of the Invention

The present invention relates to an apparatus for processing sausage and, in particular, for separating individual smoked or cooked sausage links from a series of connected sausage links.

The apparatus used for separation of individual sausage links from a chain of connected sausage links can conveniently be divided into two categories. The first category would include the link separators that are an adjunct or an integral part of a sausage linking machine, that is, a machine that forms links from stuffed sausage casings. Examples of such apparatus are found in U.S. Pat. Nos. 2,689,972; 3,059,272; 3,276,352; 3,435,482 and 4,973,039. Apparatus of this type is usually employed in the manufacture of fresh sausage.

The second category of such apparatus is the link separators that are used to separate cooked or smoked sausage links. In the manufacture of such sausage, the sausage links are formed and held together by the unfilled, twisted casing connecting adjacent links. After forming, the connected links are placed on racks in a cookhouse or smokehouse where the sausage is processed to form the finished product. The connected links are then separated into individual links for packaging and sale. The present invention is directed to this second category of link-separating apparatus. Examples of such apparatus can be found in U.S. Pat. Nos. 3,158,895; 3,808,636 and 4,060,875.

Existing apparatus employed to cut the preformed links into separate links are quite complicated considering the operation that they perform. These machines often do not properly register their cutting mechanism with the length of the link and, therefore, cut the sausage link itself rather than cutting the twisted casing between adjacent links. These machines often employ complicated and expensive electric-eye sensors and other technically sophisticated mechanisms. Even when the indexing is proper, cutting occurs indiscriminately by any point between adjacent links. Aesthetically it is better to center the cut between links so that equal amounts of the twisted casing are left on either end. It is, at times, more preferable to cut the casing between links as close to the end of the link as possible so that all the twisted casing is removed.

SUMMARY OF THE INVENTION

The present invention relates to a very simple and uncomplicated sausage separating apparatus. The apparatus has very few moving parts and does not require a sensing device or an indexing device to locate the position of the link end to cut in the proper position. The present apparatus automatically places adjacent links in the proper position to cut the twisted casing between adjacent links and separate the links. The present apparatus significantly reduces the incidence of cutting the sausage link itself and results in less product rejects. In addition, because of the simplicity of the present apparatus, it may be operated by hand or may be motor driven if higher production rates are desired and may be readily disassembled for cleaning.

BRIEF DESCRIPTION OF THE DRAWINGS

FIG. 2 is an end view of the apparatus of the present invention, partially in cross-section, and showing a pair of cutting elements in a fully opened position.

FIG. 3 is a modification of the apparatus of FIG. 2 showing a motor-driven drive mechanism for the apparatus.

FIG. 4 is an exploded assembly view of a pair of cutting elements of the present apparatus.

FIG. 5 shows the position of a pair of cutting elements in a fully opened position.

FIG. 6 is a top view, partially in section, of a pair of the cutting elements in a closed position.

DETAILED DESCRIPTION OF THE INVENTION

Figure 1:
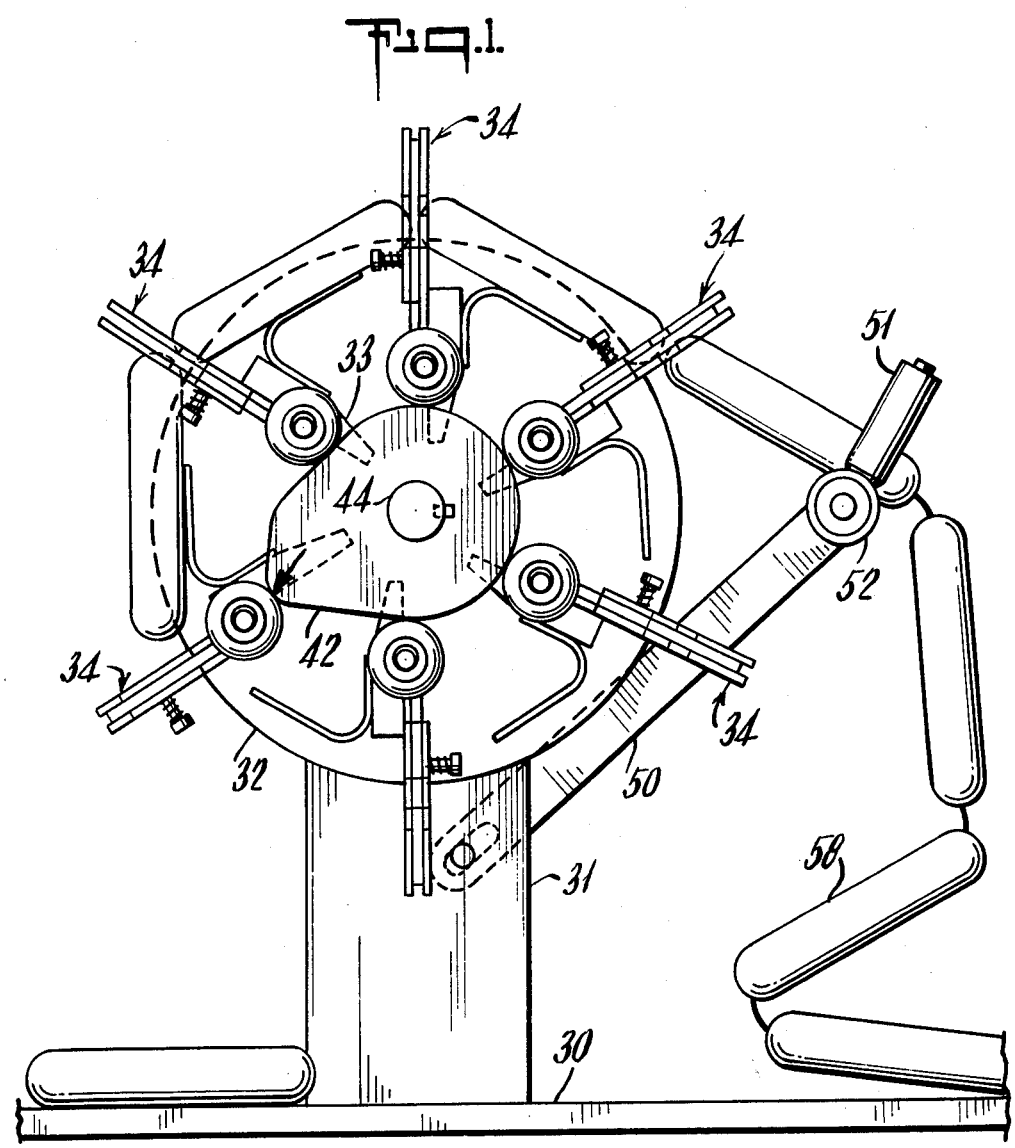
FIG. 1 is a side elevation view of the apparatus of the present invention.

As depicted in FIG. 1 and FIG. 2, the apparatus of the present invention has a base 30 upon which are suitably mounted supports, one of which is shown in FIG. 1 as element 31. Movably attached to the support is a mounting means in the form of a plate or a disc 32 upon which are mounted brackets 33 with a series of pairs of cutting arms 34 affixed to the brackets. A pair of cutting arms will hereinafter at times be referred to as a cutting assembly. These cutting arms are capable of being moved into an open or closed position as they are rotated around a stationary shaft 44 upon which is mounted a pair of cams 42, one of which is shown in FIG. 1. There are cam followers 53 associated with each of the cutting arms to move the cutting arms to open and close them in a manner determined by the shape of the cam. A chain of connected sausage links 58 is fed between a pair of upright roller guides 51 (one of which is shown in FIG. 1) and a horizontal roller guide 52, which are mounted to the support 31 through an adjustable support arm 50 and then fed into the space defined by a pair of open cutting arms. Two connected sausage links are positioned in the opening of a pair of cutting arms. As the mounting plate is rotated by hand or through a motor-driven mechanism, a pair of cutting arms will open and close according to the high and low points on the cams 42. The chain of sausage links is fed into the cutting arms, and, as the cutting arms are carried around the centerline of the machine, which is through the stationary shaft 44, the cams 42 force the cutting arms together to separate individual sausage links from the chain of connected links.

The driving mechanism to rotate the mounting plate is shown in FIG. 2. The mounting plate 32 is keyed into a collar 63 which is mounted on free turning bearings on shaft 44. The shaft 44 is mounted on the supports 31 and 81 so that the shaft is fixed and the collar and mounting plate 32 are capable of rotating around the shaft. There is a chain 46 attached to the collar 63 through a suitable sprocket 74 and the chain is also attached to suitable sprocket 75 attached to rotating shaft 45. There is a crank 47 affixed to the shaft 45 and, upon rotation of the crank 47, the collar 63 is rotated by the chain 46 to turn the mounting plate 32 in a circular or endless motion. There is a stationary external bushing and safety cover 65 over the collar 63.

There are a series of support brackets 33 affixed to the mounting plate 32. One end of these brackets is affixed in a slot 60 by bolts 66 in the mounting plate in such a fashion that they may be moved along the radius of the mounting plate. Attached to the other end of each bracket is a pair of cutting arms 34. It should be understood that the number of pairs of cutting arms that can be attached to a mounting plate depends on the diameter of the mounting plate and the desired distance between adjacent pairs of cutting arms. The desired distance between adjacent pairs of cutting arms will be determined by the length of the sausage link fed to the apparatus. By moving the support brackets radially on the mounting plate, it is possible to adjust the apparatus to the length of the link. Moving the brackets radially outward on the mounting plate will cut a longer link as it will increase the respective distance between adjacent pairs of cutting arms. Conversely, moving the support brackets radially inward on the mounting plate will adjust for shorter lengths of the sausage link to be cut. It is also to be understood that when sausage links of a different length are to be cut, the cams 42, which are keyed to the shaft 44, must also be be changed to insert larger or smaller cams, depending on whether longer or shorter sausage links are to be cut. The cutting arms have an opening which is preferably V-shaped as best shown in FIGS. 4 and 5. The particular shape of the opening is not critical. A V-shaped opening is shown in the drawings, but the opening may be semicircular, semielliptical or another geometric configuration. The opening in a cutting arm must face the corresponding opening in the other cutting arm in the same cutting arm pair to allow the links to be fed between the open cutting arms. In the preferred form of the apparatus, the openings in the cutting arms have the same shape or configuration. However, it is possible for the openings in a pair of arms to be of a different shape or to have an opening in only one of the cutting arms in a pair. The other cutting arm in a pair would have a flat surface on the edge of the arm facing the opening.

One of the cutting arms in each pair of cutting arms is made with double matched cutting elements 70, which may be mirror images of each other, separated by a spacer block 71. At least the upper surface 69 of spacer block 71 is at an angle to the cutting slot 64. This angled surface is to allow the twisted casing cut from adjacent links to be removed with less probability that the cut casing will fall into the working elements of the apparatus. The other cutting arm, 72 shown as in FIG. 4, in the same pair contains an anvil-like cutting element 73 that will contact the cutting surfaces of the matched cutting elements in the first cutting arm to cut the twisted casing which joins adjacent sausage links. The spacer block 71 is the same thickness as the anvil cutting element 73. The matched cutting elements 70 are joined together by a bolt 82 that passes through the spacer block 71. A spring 83 urges the matched cutting elements together but will allow the anvil cutting element 73 to pass between the matched cutting elements even if there is a small degree of misalignment in the cutting arms. A pair of pins 79 extend between the matched cutting elements 70 through the holes in the spacer block 71 to maintain the cutting elements aligned in the proper position. The cutting arm containing the matched cutting elements 70 will be referred to as the matched cutting arm, and the cutting arm containing the anvil cutting element 73 will be referred to as the anvil cutting arm. The cutting arms contain a cutting insert 36 which is force fitted into the cutting arm. The cutting insert may be replaced if required. The cutting inserts 36 preferably have a concave surface on that side of the cutting insert opposite the anvil cutting surface.

There may be a slot 64 at the base of each opening in the matched cutting elements which may be punched or formed directly in the arm or may be formed in the removable insert 36 which is force fitted into each arm. In the event that is is desirable to remove more of the twisted casing being linked, an anvil cutting element 73 having a greater thickness may be employed. As the spacer block 71 is the same thickness as the anvil cutting element, the spacer block would also be changed.

There may be a flat deflector plate 67 attached to each of the brackets 33 to assist in guiding the links to the cutting arms and to prevent the links from falling onto the cams 42.

If it is desired, it is possible to power drive the shaft 45 as shown in FIG. 3. The crank is removed from the shaft 45, and a motor 49 is attached through suitable sprockets 76 and 77 and drive chain 48 to the shaft 45 to turn collar 63 and mounting plate 32 in the same manner as explained above.

The assembly of each pair of cutting arms is best shown in the exploded view of FIG. 4. The cutting arms are attached to a mounting bracket 33 by means of a bolt 37 or other suitable fastener. Each of the cutting arms has a cam follower wheel 53 attached to the arm by means of a cam follower pin 54. The cam follower wheel is attached so that it is capable of rotating freely around the cam follower pin 54. In order to obtain this rotation, it is preferable to fix a plastic washer 55 between the cam follower wheel and the cutting arm and between the wheel 53 and the locking rings 57. The inner cutting element in the matched cutting arm, that is, the cutting element arm closest to the bracket, is attached to the bracket 33 so that it is flush with the bracket. A spring 39 is coiled in such a fashion that a bushing 38 may pass through the coil. The ends of the spring are bent over pins 41 attached to the arms, which tends to force the cutting arms apart. A slot 68 may be cut into the pin 41 to receive the end of the spring and hold it securely. The bushing 38 lies between the bolt 37 and the spring 39 to prevent the spring from binding. There is a cutout portion 43 in the bracket 33 to accommodate the follower wheel on the cutting arm 72 as shown in FIG. 4. There is also a cutout portion 35 in the cutting arm 72 to allow clearance for the pin 41 on the inner cutting arm. Each of the openings in the cutting arms has a lower surface 61 and an upper surface 62. These surfaces may be beveled as shown in FIG. 5. When the cutting arms are in the fully opened position, the lower surfaces 61 of the arms co-act in such a way as to form a relatively flat surface to receive the sausage links as they are introduced into the machine. This is best shown in FIG. 2.

As the mounting plate attached to collar 63 is rotated, the cam follower 53 will open or close the cutting arms, depending on the high and low surfaces on the actuator cams 42.

There is a slot 64, which is relatively narrow, formed at the closed end of the cutting elements or cutting insert 36 in the matched cutting arm 70. The presence of the slot 64 prevents excessive pressure on the links when the links are being positioned to make the cut of the twisted casing between adjacent links. At the end of the slot, there is a cutting surface 56 which is capable of interacting with the anvil-like cutting element 73 on the anvil cutting arm in a given pair to cut the sausage links at the appropriate point in the cycle. The cutting surface is cut at an angle of from about 10° to 45°. The cutting action is a scissors-type action. The interaction of the cutting surfaces is best shown in FIG. 6. The preferred method of forming the slot and the cutting surface is with a replaceable insert 36, which is shown in FIGS. 4 and 5. The thickness of the insert is less than the thickness of the forming arm into which the insert is placed. The outer surface, that is the surface away from the cutting edge of the insert, has an indented or concave portion which is thinner than the thickness of the cutting arm. The purpose of the indented portion is to prevent the meat-filled portion of the link from being cut as the cutting arms are moved toward each other, as will be explained below.

The preferred configuration of the cam used in the apparatus is shown in FIG. 1. The cam has a relatively long dwell area, more than 180°, and a relatively rapid rise. The long dwell area of the cam represents the open position of the cutting arms. As the cam rises, the cutting arms move toward each other and then overlap, thereby cutting the leading link free of the remaining links in the chain.

The apparatus can be readily disassembled to be cleaned. By loosening the bolts 66, the brackets 33 with the attached cutting arm assemblies can be separated from the apparatus and individually cleaned in an appropriate manner.

The apparatus can be adjusted to cut links of varying length. The cutting arms are mounted on a bracket 33 which in turn is mounted on the mounting plate or disc 32 by bolts 66. If the bracket is moved radially on the mounting plate away from its center, the distance between adjacent cutting arms will be increased, to accomodate greater length links. Moving the bracket radially away from the center will also necessitate use of an appropriately larger pair of cams 42 to give the full range of motion to the cutting arms. Moving the brackets radially toward the center of the mounting plate and installing smaller cams will give the apparatus the ability of separating links of shorter length.

The device is, therefore, quite simple to modify in order to cut sausage links of various sizes. In addition, since the space between the cutting arms, when the cutting arms are in a fully opened position, is quite large, it is possible to process sausage links of varying diameters on the apparatus without any additional adjustments.

Although the apparatus in the drawings shows the cutting arms mounted on a circular disk, it is also possible to mount the cutting arms on a carrier such as a chain or other belt which may move in a straight line for portions of the cycle. In such embodiments of the present invention, the cams 42 may be replaced by cam actuators, which are metal or plastic strips flat on one edge and having a raised surface equivalent to the cam configuration on the other edge.

Operation of the Apparatus

The individual links in a string or chain of links are connected by casing from which the meat emulsion has been removed by a linking machine, and the sausages are generally fully cooked or cured. The link end between the first and second link in a string of connected links is fed by hand into the open space between a pair of cutting arms 34. The mounting plate 32 is then rotated by hand or by the motor drive. As the mounting plate is rotated, the follower wheels 53 will ride onto the rise in the cam and force the cutting arms 34 toward one another. As the arms 34 move toward one another, they will contact the end portions of the sausage links on either side of the arms and force the end portion of the links away from the cutting arms. The action of the cutting arms pushing away the end portion of the links centers the unfilled casing between adjacent links into the slot 64 of the cutting arms. As the cutting arms continue their movement into an overlapping relationship, the cutting edges at the closed end of the slot in the matched cutting arm contact the edges of the anvil in the anvil cutting arm, cutting the twisted casing between the links and cutting the leading link from the remainder of the links in the string. The closing cutting arms also hold a link and pull the succeeding links in the chain into the apparatus. As the mounting plate continues to rotate, successive trailing links will be fed into the successive cutting assemblies and severed from the string in a similar manner.

As shown in FIG. 1, the rise in the cam is at first rapid, and then there is a gradual rate until the cutting is complete. The arrow directed to the surface of the cam in FIG. 1 shows the high point on the surface of the cam where the cutters overlap and sever the link. The purpose of the gradual rise portion of the cam is to allow the casing between adjacent link ends to be placed in the proper position to be cut. As the cutting arms move toward one another, the preformed link end will be formed away from the closing cutting arms and away from the slots 64. The portion of the casing between adjacent links will be positioned into the cutting edges at the end of slots 64. The sausage link end, which is on the downstream end of the chain of links, can be forced forward since the preceding link has been completely severed, and the cutting arms that severed that link are completely opened. The sausage link end which is connected to the series of links to be severed can be forced backwards as the trailing pair of cutting arms is not yet closed. The movement of the downstream link end forward and the succeeding link backward centers the casing twist or tie between the links into the cutting surfaces thereby cutting the links in the tie and not through any of the meat emulsion at the end of a link. The centering action of the present apparatus is both desirable and necessary, because the linking machines tend to make sausage links that have some variation in length. The centering action of the present apparatus eliminates the problems of waste caused by shoulder cuts and miscuts. The present apparatus also readily centers sausage links of varying diameters for cutting.

I claim:

1. Apparatus for separating individual sausage links from a chain of connected sausage links comprising:
   a support frame;
   a mounting means attached to the support frame and capable of moving in an endless cycle;
   means to move said mounting means;
   a plurality of support brackets affixed at spaced points on said mounting means;
   a pair of cutting arms attached to each of said support brackets;
   each of said cutting arms having at the end of said arm an opening which faces toward the opening in the other cutting arm of the same pair;
   the first cutting arm of said pair comprising two cutting elements spaced from each other,
   the second cutting arm of said pair having an anvil which is capable of tightly fitting in the space between the cutting elements in the first cutting arm to cut the twisted casing between adjacent links;

means to direct a string of connecting sausage links into the space formed by the opening in a pair of cutting arms;

a follower attached to at least one of the cutting arms in each pair;

an actuator attached to said support frame and operatively connected to said cutting arms through said followers to first move at least one of the cutting arms in each pair toward one another to contact connected ends of adjacent sausage links when said mounting means is moved in an endless cycle;

said actuator being capable of moving said cutting arms toward one another until the cutting surfaces in a pair of cutting arms overlap, thereby cutting an individual link from the chain of connected links.

2. The apparatus of claim 1 in which the cutting elements in said first cutting arm are biased toward one another by a spring.

3. The apparatus of claim 1 in which the cutting elements in said first cutting arm comprise cutting insert force fit into the cutting arms, said cutting insert including a slot-shaped opening with a cutting edge at the closed end of said opening.

4. The apparatus of claim 3 in which the cutting inserts have a concave surface on that surface which faces away from the anvil on said second cutting arm.

5. Apparatus for separating individual sausage links from a chain of connected links comprising:

a plurality of cutting assemblies mounted on a carrier capable of moving in an endless path, each of said cutting assemblies comprising an anvil cutting element and a double cutting element, said anvil cutting element comprising an anvil with two parallel flat cutting surfaces, said double cutting element containing two cutting surfaces separated by a spacer block which is equal in thickness to the thickness of said anvil, an actuator in contact with the cutting elements to move the anvil cutting element from a position spaced away from the double cutting element to a position in contact with the cutting surfaces of said double cutting element, means to direct a chain of connected sausage links between the separated cutting elements in a cutting assembly, means to move the carrier in an endless path and to contact the actuators and move the cutting elements into a cutting position to separate a sausage link from the chain of connected links.

* * * * *